(12) United States Patent
Bodum

(10) Patent No.: US 10,820,738 B2
(45) Date of Patent: Nov. 3, 2020

(54) COLLECTION RECEPTACLE FOR COLLECTING INSOLUBLE MATERIAL THAT IS USED FOR PREPARING BEVERAGES, AS WELL AS INFUSION DEVICE WITH SUCH A COLLECTION RECEPTACLE

(71) Applicant: Pi-Design AG, Triengen (CH)

(72) Inventor: Jørgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 238 days.

(21) Appl. No.: 15/762,110

(22) PCT Filed: Nov. 2, 2016

(86) PCT No.: PCT/EP2016/076423
§ 371 (c)(1),
(2) Date: Mar. 22, 2018

(87) PCT Pub. No.: WO2017/080885
PCT Pub. Date: May 18, 2017

(65) Prior Publication Data
US 2018/0289200 A1 Oct. 11, 2018

(30) Foreign Application Priority Data
Nov. 11, 2015 (DE) .......... 10 2015 119 406

(51) Int. Cl.
*A47J 31/20* (2006.01)
(52) U.S. Cl.
CPC ..................... *A47J 31/20* (2013.01)

(58) Field of Classification Search
CPC .......................................... A47J 31/20
See application file for complete search history.

(56) References Cited

FOREIGN PATENT DOCUMENTS

| DE | 3432289 C1 | 10/1985 |
|----|------------|---------|
| DE | 20001994 U1 | 12/2000 |

(Continued)

OTHER PUBLICATIONS

Search Report for DE application 10 2015 119 406.6 dated Aug. 6, 2016.

(Continued)

*Primary Examiner* — Jason L Vaughan
*Assistant Examiner* — Amanda Kreiling
(74) *Attorney, Agent, or Firm* — Panitch Schwarze Belisario & Nadel LLP

(57) ABSTRACT

The present invention relates to a collection receptacle for collecting insoluble material that is used for preparing beverages by means of an infusion device, wherein the infusion device comprises a container with an open end and a closed end for holding the beverage and the insoluble material. A piston-filter arrangement can be inserted into the container via the open end and can be moved toward the closed end. The collection receptacle can be inserted into the container, and has an opening that is enclosed by an edge, and a first coupling element that can be coupled with a second coupling element of the piston-filter arrangement such that, in the coupled state, a distance is formed between the edge of the collection receptacle and the piston-filter arrangement. In addition, the invention relates to an infusion device with such a collection receptacle.

13 Claims, 3 Drawing Sheets

(56) References Cited

FOREIGN PATENT DOCUMENTS

| EP | 2798985 A1 | * | 11/2014 | ............. | A47J 31/18 |
|----|------------|---|---------|---------------|------------|
| EP | 2798985 A1 |   | 11/2014 | | |
| FR | 1557460 A  |   | 2/1969  | | |
| GB | 2504684 A  |   | 2/2014  | | |
| WO | 9635360 A1 |   | 11/1996 | | |
| WO | 02067739 A1|   | 9/2002  | | |

OTHER PUBLICATIONS

Int'l Search Report dated Jan. 4, 2017 in Int'l Appln. PCT/EP2016/076423.

* cited by examiner

COLLECTION RECEPTACLE FOR COLLECTING INSOLUBLE MATERIAL THAT IS USED FOR PREPARING BEVERAGES, AS WELL AS INFUSION DEVICE WITH SUCH A COLLECTION RECEPTACLE

CROSS-REFERENCE TO RELATED APPLICATIONS

This application is a Section 371 of International Application No. PCT/EP2016/076423, filed Nov. 2, 2016, which was published in the German language on May 18, 2017, under International Publication No. WO 2017/080885 A1, which claims priority under 35 U.S.C. § 119(b) to German Application No. 10 2015 119 406.6, filed Nov. 11, 2015, the disclosures of which are incorporated herein by reference in their entirety.

BACKGROUND OF THE INVENTION

The present invention relates to a collection receptacle for collecting insoluble material that is used for preparing beverages by means of an infusion device. The invention also relates to an infusion device with such a collection receptacle.

Infusion devices for preparing beverages are also called French presses or filter presses. The infusion device has a container with an open end and a closed end, wherein the container typically has a cylindrical or prismatic shape. For preparing coffee or tea, the desired amount of insoluble material, such as ground coffee or tea leaves, is filled into the container and then hot water is poured over this material. Then the ground coffee or tea leaves steep for a certain amount of time. Then a piston-filter arrangement that has a piston rod and a filter press attached to the piston rod is inserted into the container. Typically, the piston rod is mounted movably in a cover that is placed on the open end and with which the container can be closed and sealed. The filter press has a shape corresponding to the cross section of the container, so that the filter press forms a seal with the container on the side. The filter press is pressed by means of the piston rod toward the closed end. In this way, the extracted ground coffee or the extracted tea leaves are separated from the coffee or tea and compressed in the area of the closed end. The filtered coffee or tea can now be drunk. After the coffee or tea has been completely consumed, the piston-filter arrangement is pulled out from the container and the compressed ground coffee or the compressed tea leaves are removed from the container.

Depending on how much ground coffee or tea leaves have been used, these can be compressed rather strongly, so that their removal from the container and the cleaning of the container can be rather laborious. In many cases, the ground coffee and the tea leaves are removed with the use of water and then put down the drain, which can lead to clogged drainage pipes.

Collection receptacles have been proposed to counteract this disadvantage. DE 34 32 289 C1, WO 02/067739 A1, EP 2 798 985 A1, and WO 96/035360 A1 disclose collection receptacles or collection plates that are inserted into the container before the insoluble material and the water are filled into the container. When the filter press of the piston-filter arrangement is pressed toward the closed end of the container, the insoluble material collects in the collection receptacle. In addition, the piston-filter arrangement is coupled with the collection receptacle when the filter press is pressed downward, so that the collection receptacle can be pulled out from the container together with the piston-filter arrangement. This configuration significantly simplifies the cleaning of the container. In addition, the collection receptacle can be emptied into a trash can, so that the amount of insoluble material going down the drain can be significantly reduced, and clogs can be prevented.

For the infusion devices that are described in WO 96/035360 A1 and DE 34 32 289 C1, the piston-filter arrangement is coupled with the collection receptacle such that the filter press is inserted into the collection receptacle. Here, the coupling in WO 96/035360 A1 is created by a friction fit between the filter press and the collection receptacle, while in DE 34 32 289 C1 the collection receptacle has locking means that interact with the filter press and provide a positive fit. WO 02/067739 A1 and EP 2 798 985 A1 disclose collection plates that are coupled with the filter press by means of a positive fit.

In particular, if a relatively large amount of insoluble material has been used, the insoluble material must be compressed so that the filter press can be inserted into the collection receptacle, which can require a relatively large amount of force. The greater the expended force, the stronger the insoluble material is compressed, which blocks the filter press starting at a certain degree of compression. Consequently, a force is applied to the water surrounding the compressed material, because it can no longer flow through the filter press. The water then searches for other ways, for example, through the contact surface between the container and the filter press, to equalize the corresponding pressure. But because the filter press is somewhat pre-tensioned against the container, a correspondingly large force must be applied to the water in order to overcome the contact surface. If the corresponding pressure is exceeded, a portion of the water suddenly flows through the contact surface, which can lead to short-term, wave-like movements of the water in the container, by means of which a portion of the water can splash out of the container. The corresponding pressure and the force to be applied by the user for this purpose are difficult to predict, however, which can make the operation of the infusion device difficult.

BRIEF SUMMARY OF THE INVENTION

The problem of the present invention is therefore to indicate a collection receptacle and an infusion device of the type described above, with which the disadvantages specified above are counteracted. In particular, the coupling of the collection receptacle with the piston-filter arrangement can be created with little expenditure of force, even if a greater amount of insoluble material is used. In addition, sudden, wave-like movements of the water or of the beverage while pressing down on the filter press should be prevented.

This problem is solved with the features specified in Claims 1 and 11. Advantageous embodiments are the subject matter of the dependent claims.

One embodiment of the invention relates to a collection receptacle for collecting insoluble material that is used for preparing beverages by means of an infusion device, wherein the infusion device comprises a container with an open end and a closed end for holding the beverage and the insoluble material and a piston-filter arrangement that can be inserted into the container via the open end and can be moved toward the closed end, wherein the collection receptacle can be inserted into the container and has a wall that forms an opening enclosed by an edge and at least one first coupling element that can be coupled with at least one second coupling element of the piston-filter arrangement such that, in the coupled state, a distance is formed between the edge of the collection receptacle and the piston-filter arrangement, where the first coupling element is arranged on a central projection of the collection receptacle and the central projection extends past the edge.

In the scope of this application, a piston-filter arrangement should be understood as the following: the piston-filter arrangement comprises a filter press that can be made, for example, from a fine-pore mesh made from metal and is fastened to a piston rod. The filter press can be arranged, for example, between two plates, in order to form it into the desired shape and hold it in this shape. The plates have corresponding holes, in order to not prevent the flow of liquid through the filter press. The plates are shaped so that the filter press covers the entire cross section of the container and contacts the side wall of the container.

As already described, the collection receptacle is inserted into the container before the insoluble material and the water are filled into the container. After the water and the insoluble material have had sufficient time to interact with each other, the filter press is pressed toward the closed end of the container by means of the piston rod, so that the insoluble material is separated from the water and the filter press is coupled with the collection receptacle. The coupling elements can be designed, for example, so that the coupling is created by means of a friction fit or by means of a magnetic interaction.

According to the invention, a distance remains between the edge of the container and the piston-filter arrangement, when the collection receptacle is coupled with the piston-filter arrangement. Thus, in the coupled state, the position of the filter press relative to the collection receptacle is clearly defined. In this way it is prevented that the insoluble material is compressed too strongly, especially when a larger amount of material is used. The force that is necessary to couple the piston-filter arrangement with the collection receptacle is kept small in this way. Excessive loading of the piston-filter arrangement and especially the piston rod and the filter press is hereby prevented. It is also prevented that a portion of the water that surrounds the compressed insoluble material flows suddenly through the contact surface between the filter press and the container and thus creates a wave-like movement of the water in the container and a resulting splashing of the water out of the container. The operation of the infusion device is hereby made easier and safer.

The first coupling element is here arranged on a central projection of the collection receptacle. A central projection is simple to produce, because the collection receptacle can have a rotationally symmetric shape. It also does not require a large volume of space, so that the capacity of the collection receptacle for holding the insoluble material is barely reduced. In addition, the central projection disturbs the flow of water that surrounds the insoluble material practically not at all, so that the wave-like movements described above do not occur as is known from the prior art. Furthermore, the coupling between the collection receptacle and the piston-filter arrangement can be created with only one first and one second coupling element, which simplifies the production and keeps it convenient.

The central projection extends past the opening outward or upward. By means of the length of the central projection, the distance between the edge and the piston-filter arrangement in the coupled state can be selected with low production expense.

Another embodiment distinguishes itself in that the central projection has a first height and the collection receptacle has a second height at the edge and the central projection extends with a height difference between 1 mm and 8 mm and in particular between 2 mm and 6 mm past the edge. The height difference is given from the difference between the first height and the second height, which defines the distance between the edge and the piston-filter arrangement in the coupled state. It has been shown that the previously mentioned splashing can be prevented in an especially effective way if the height difference is in the specified range. If the height difference is selected too large, the portion of the insoluble material that is located in the coupled state between the edge and the piston-filter arrangement and is not held by the collection receptacle is too big. This portion can be dispensed uncontrollably when pulling out the collection receptacle coupled with the piston-filter arrangement, which can result in undesired soiling. If the height difference is within the specified range, the risk that this portion is dispensed uncontrollably is relatively low.

According to another embodiment, the collection receptacle has a diameter and the ratio of the height difference to the diameter is between 0.01 and 0.07 and, in particular, between 0.02 and 0.06. The tendency for splashing generally increases with decreasing diameter, because due to the decreasing surface area of the opening, the pressure applied by the piston-filter arrangement in the collection receptacle is increased. If this ratio is in the specified range, the already described uncontrolled splashing is effectively prevented.

In one refined embodiment, the central projection surrounds a hollow space. In principle, the central projection can have a solid construction, but material and weight can be saved by providing a hollow space, without reducing the stability of the central projection too much compared with a solid construction. In addition, a solid projection could lead to non-uniform cooling, which could lead to sink marks. The originally intended shape of the projection then could no longer be guaranteed. The hollow space could also taper conically toward the free end, which simplifies removal of the die.

According to a refined embodiment, the first coupling element comprises a coupling opening in the hollow space on a free end of the central projection. The second coupling element can interact with the coupling opening for coupling the collection receptacle with the piston-filter arrangement, in particular, such that the second coupling element is guided through the coupling opening. The coupling opening can be easily produced and can be made, e.g., in the injection molding method or they can be produced at a later time with a relatively simple drilling process.

It is provided that the coupling opening tapers conically viewed from the free end. As already mentioned, the coupling of the collection receptacle with the piston-filter arrangement can be created such that the second coupling element is guided through the coupling opening. The conical tapering here realizes a centering process, so that the coupling can be achieved without a problem, even if the first and the second coupling element are not oriented exactly flush with each other. With the selection of the magnitude of the tapering, the stability of the coupling opening can be increased. In this way it can also be determined how rigidly the filter-piston arrangement is coupled with the collection receptacle and what force is needed for detaching the piston-filter arrangement from the collection receptacle.

According to another embodiment, the central projection has at least one recess that starts from the free end and penetrates through the wall. With the recess, the projection is selectively weakened in the area of the free end, where the first coupling element is also arranged, so that the coupling opening can widen somewhat when the second coupling element is guided through. It is provided to produce the collection receptacle from an elastically deformable plastic, such as Tritan or POM (polyoxymethylene), so that the coupling opening pulls itself back together again to the original size after the widening. With the dimensioning of the recess, the force that is needed for widening the coupling opening can be influenced selectively.

According to another embodiment, the central projection is formed by the wall. Consequently, the projection can be constructed as an integral component of the collection receptacle and does not have to be connected to the rest of the collection receptacle as a separate part in an additional processing step. In this way, the production of the collection receptacle according to the proposal is significantly simplified.

In a refined embodiment, the wall forms a base area and a side area, where the wall in the side area runs approximately perpendicular to the base area. In this way, a relatively optimal use of space is achieved, so that the collection receptacle can provide a relatively large volume for holding the insoluble material with a relatively low use of materials. The provided volumes are, e.g., between 5 and 25 $cm^3$, so that a sufficiently large volume is provided for holding the quantity of insoluble material, such as ground coffee or tea leaves, typically used for preparing a beverage. The designation "approximately perpendicular" should be understood to mean that one should try to arrange the side area as perpendicular to the base area as possible. However, for removing from the injection molding tool without a problem and without damage, it is necessary to let the side area be slightly conical. Depending on the plastic that is being used, the angle between the base area and the side area deviates between 0.5 and 2.5° from a right angle.

In an alternative embodiment, the collection receptacle has a number of passage openings. The passage openings must be designed so that produce a separation of the water from the compressed insoluble material within the collection receptacle, by means of which water can be removed from the compressed insoluble material. Removing the water prevents water from dripping out of the collection receptacle uncontrollably during the cleaning process. This also prevents too high a pressure from building up in the collection receptacle when the insoluble material is compressed with the piston-filter arrangement. This configuration also simplifies the coupling of the collection receptacle with the piston-filter arrangement.

One construction of the invention relates to an infusion device for preparing beverages, comprising a container with an open end and a closed end for holding the beverage and the insoluble material, a piston-filter arrangement that can be inserted into the container via the open end and can be moved toward the closed end, and a collection receptacle that can be inserted into the container, in particular, according to one of the previously described embodiments, which can be coupled with the piston-filter arrangement, wherein, in the coupled state, a distance is formed between the collection receptacle and the piston-filter arrangement. The technical effects and advantages that can be achieved with the infusion device according to the proposal correspond to those that have been explained for the collection receptacle according to the proposal. In summary, it should be noted that a collection receptacle with an infusion device according to the proposal can be connected to the piston-filter arrangement with significantly less expenditure of force in comparison with infusion devices known from the prior art, without producing uncontrolled, wave-like movements within the water, which significantly reduces the likelihood that the water will splash uncontrollably out of the container.

In another embodiment, the distance between the edge and the piston-filter arrangement is between 3 and 10 mm, in particular, between 4 and 6 mm. It has been shown to be advantageous to select the distance within this range. On one hand, the volume of the filtered beverage is not limited too much and, on the other hand, it is guaranteed that the insoluble material is not compressed too strongly and thus the collection receptacle can be coupled with the piston-filter arrangement and separated from each other again without a great expenditure of force. Especially in combination with the spherical or cylindrical section, it is guaranteed with this distance that the collection receptacle can be rotated relative to the piston-filter arrangement in a sufficient extent, without collisions.

In another embodiment, the first coupling element and the second coupling element comprise positive-locking means that interact with each other in the coupled state. The use of positive-locking means has the advantage that relatively expensive materials that are questionable for reasons of food safety, for example, magnetic or magnetizable materials, are no longer necessary. Compared with a coupling using a friction fit, the positive-locking means have increased reliability. With the methods available today for shaping, for example, injection molding, it is possible without great expense to form the coupling elements accordingly. In addition, the positive-locking means can be constructed so that clear feedback can be given to the user when the collection receptacle is coupled with the piston-filter arrangement, for example, by a perceptible latching.

One embodiment is distinguished in that the first coupling element or the second coupling element comprises an essentially spherical or cylindrical section that is surrounded in the coupled state by locking arms of the other respective coupling element. The spherical or cylindrical section provides a back-cut section in which the locking arms can engage. In this embodiment, the collection receptacle can rotate relative to the piston-filter arrangement at least about one axis. This configuration significantly simplifies the detachment of the collection receptacle from the piston-filter arrangement after the infusion device is used, because the user can move the collection receptacle into a favorable position relative to the piston-filter arrangement. In particular, if the coupling elements are arranged on the central projection, the angle of rotation with which the collection receptacle can be rotated with respect to the piston-filter arrangement is relatively large and increases with increasing distance between the edge and the filter press. The greater the angle of rotation, the easier it is for the user to separate the collection receptacle from the piston-filter arrangement.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3a a cross-sectional illustration through a second preferred embodiment of the collection receptacle according to the preferred invention; and FIG. 3b a perspective illustration of the collection receptacle shown in FIG. 3a.

DETAILED DESCRIPTION OF THE INVENTION

Figure 1:
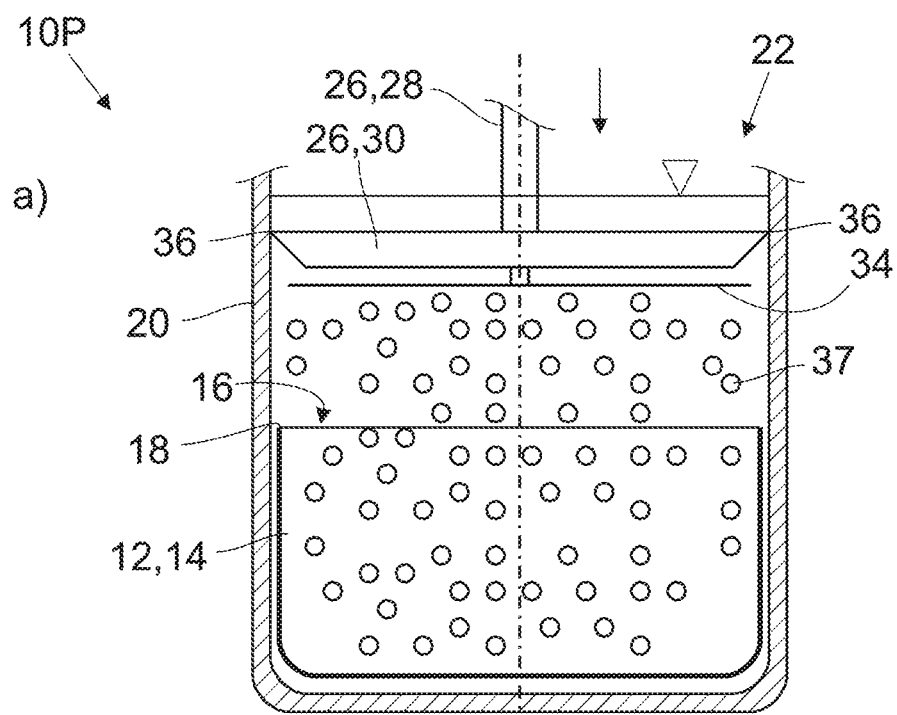
FIG. 1a is a principle illustration of a lower part of an infusion device with a collection receptacle according to the state of the art, in the not coupled state.
FIG. 1b is the infusion device shown in FIG. 1a in the coupled state.
Figure 1:
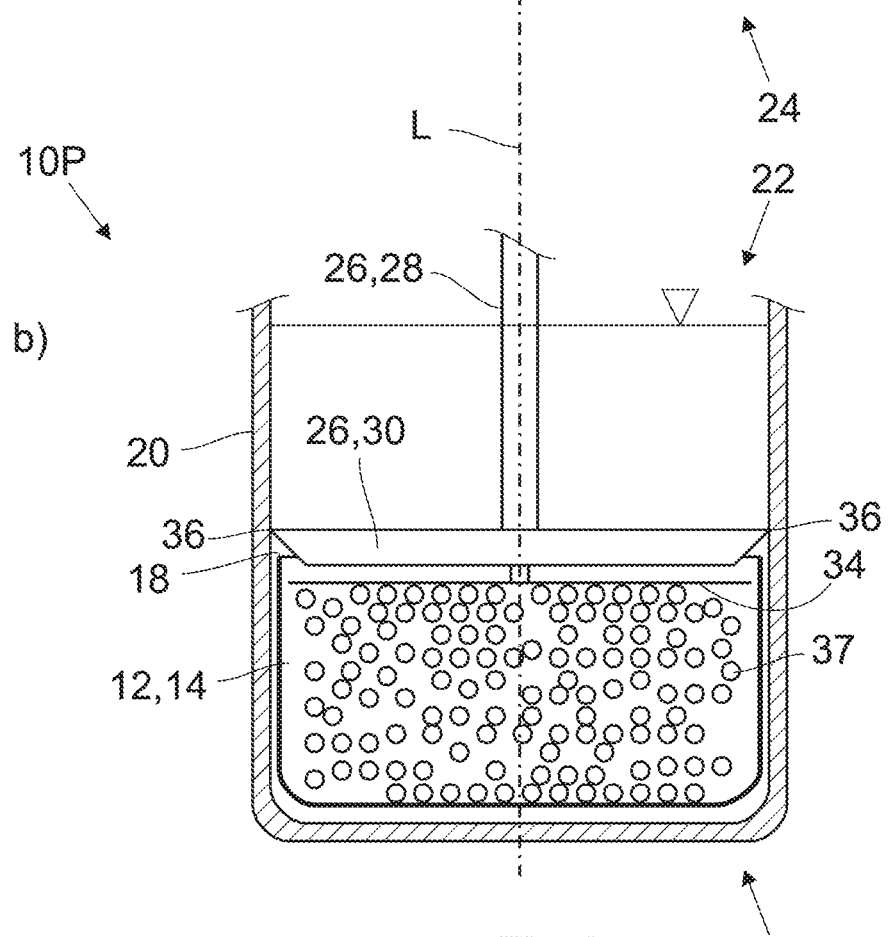

In FIGS. 1a) and 1b), the lower part of an infusion device 10P with a collection receptacle 12 according to the prior art is shown. The collection receptacle 12 is formed essentially by a wall 14 and has an opening 16 that is enclosed by an edge 18.

The infusion device 10P comprises an essentially cylindrical container 20 with a longitudinal axis L and with an open end 22 and a closed end 24. The infusion device 10P further comprises a piston-filter arrangement 26 that has a piston rod 28 and a filter press 30 attached to this rod. The filter press 30 is fixed to an upper plate 32 (not shown here, see FIG. 2) arranged above the filter press 30 and a lower plate 34 arranged under the filter press 30 so that the filter press 30 contacts the container 20 on the side, by means of which a side contact surface 36 is formed.

For preparing a beverage, first the collection receptacle 12 is inserted into the container 20, so that it contacts the closed end 24 of the container with the section of the wall 14 that is opposite the opening 16. The collection receptacle 12 must be dimensioned so that it also nearly contacts the container 20 on the side, but a certain gap must be provided, in order to prevent the collection receptacle 12 from becoming stuck in the container 20. Then a certain amount of an insoluble material 37, for example, ground coffee or tea leaves, is placed in the container and water, typically hot water, is poured over this material. Here, the poured insoluble material 37 is distributed essentially uniformly inside the container 20. After the insoluble material 37 has been allowed to interact with the water for the desired amount of time, the piston-filter arrangement 26 is inserted into the container 20 via the open end 22 and the filter press 30 is pressed by means of the piston rod 28 along the longitudinal axis L toward the closed end 24 of the container 20 (see FIG. 1a)). The farther the filter press 30 is pressed toward the closed end 24 of the container 20, the more the insoluble material 37 is compressed and moved toward the collection receptacle 12. Starting from a certain position of the filter press 30, this is immersed with the lower plate 34 into the collection receptacle 12 (see FIG. 1b)). Depending on the construction of the filter press 30 and the collection receptacle 12, the coupling is created by means of a friction fit between the filter press 30, here essentially with the lower plate 34, and the inner surface of the collection receptacle 12, as shown in FIG. 1b), or by means of a positive fit between the filter press 30, in particular, the lower plate 34, and the collection receptacle 12, wherein, in the latter case, corresponding connection elements can be provided (not shown). In both cases, a prerequisite for the coupling is that the filter press 30 is inserted at least partially into the collection receptacle 12.

If, however, the quantity of the insoluble material 37 is selected to be very large, for example, in order to prepare especially strong coffee, the collection receptacle 12 is very quickly filled to a large extent with the insoluble material 37. In order to nevertheless create a coupling, the filter press 30 must be inserted into the collection receptacle 12 with an increased expenditure of force against the compressed insoluble material 37, which leads, on one hand, to strong loading especially of the piston rod 28 and, on the other hand, is difficult for the user. Furthermore, the filter press 30 can become blocked by the insoluble material 37, so that the water cannot flow through the filter. If the user applies a correspondingly high force, a portion of the water flows abruptly from the area located below the filter press 30 with respect to the diagram shown in FIGS. 1a) and 1b) through the contact surface 36 into the area above the filter press 30, by means of which wave-like movements can be generated in the water and a portion of the water can splash out of the container 20.

After the beverage has been prepared and consumed and the collection receptacle 12 is to be separated from the filter press 30, the position of the piston-filter arrangement 26 cannot be changed relative to the collection receptacle 12, and in particular, the piston-filter arrangement 26 cannot be rotated relative to the collection receptacle 12, because then the filter press 30 would be out of alignment in the collection receptacle 12 and the insoluble material 37 would have to be compressed more at least on one side. This makes the separation process more difficult.

Figure 2:
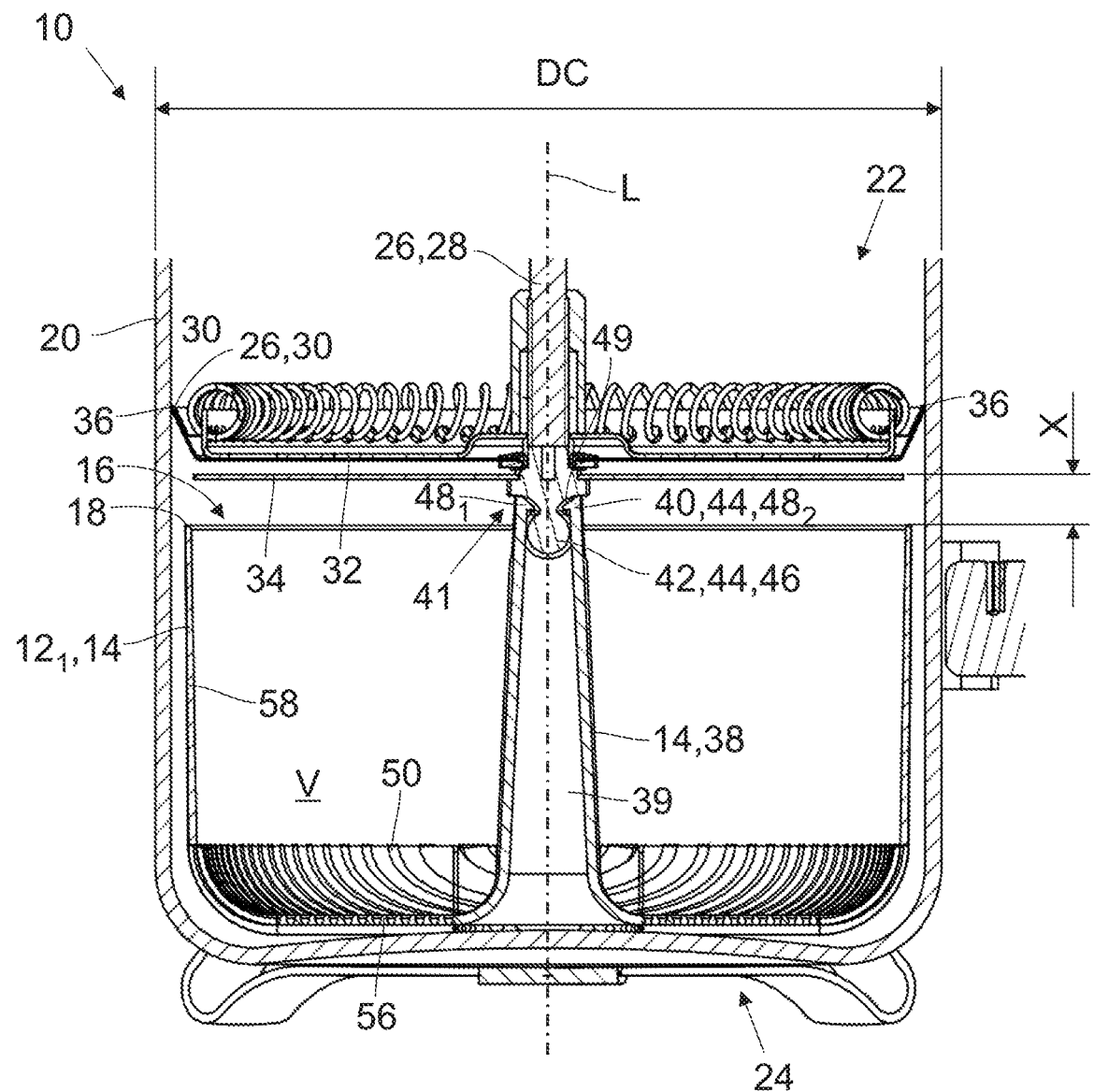
FIG. 2 is a cross-sectional illustration of a lower part of an infusion device with a collection receptacle according to the proposal according to a first preferred embodiment of the present invention in the coupled state.

In FIG. 2, an infusion device 10 according to the proposal is shown with reference to a section drawing, wherein the collection receptacle $12_1$ according to a first embodiment is coupled with the piston-filter arrangement 26. The infusion device has essentially the same basic construction as the infusion device 10 shown in FIGS. 1a) and 1b). Also shown is the diameter DC of the container 20.

In contrast to the collection receptacle that is known from the prior art and is shown in FIGS. 1a) and 1a), the collection receptacle $12_1$ according to the proposal has a central projection 38 rising from a base area 56 of the collection receptacle $12_1$ in a column-like shape about the longitudinal axis L, where this projection is formed by the wall 14, has a free end 41, and encloses a hollow space 39. On the central projection 38 there is, on its free end 41, a first coupling element 40 that interacts, for coupling the collection receptacle $12_1$ with the piston-filter arrangement 26, with a second coupling element 42 of the piston-filter arrangement 26, which is arranged approximately below the filter press 30 and the lower plate 34. In the shown example, the first coupling element 40 and the second coupling element 42 have positive-locking means 44, whereby the connection or coupling between the collection receptacle $12_1$ and the piston-filter arrangement 26 is created by means of a positive fit. In the actual case, the second coupling element 40 has a spherical section 46 that is surrounded, in the coupled state, by two locking arms $48_1$ and $48_2$ of the first coupling element 40 formed by the projection 38. The spherical section 46 forms back-cut sections 49, in which the locking arms $48_1$ and $48_2$ engage.

Figure 3:
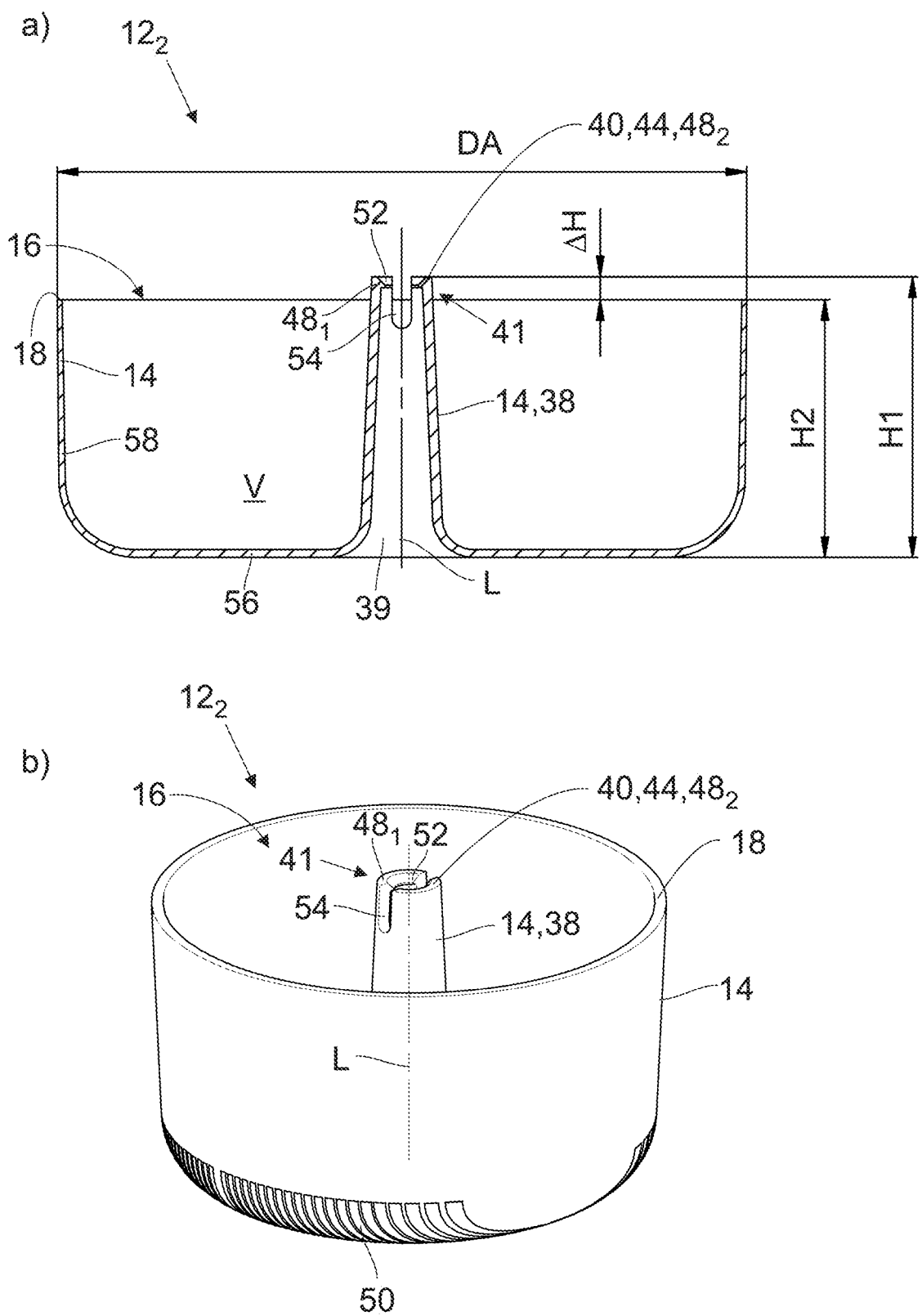

The collection receptacle shown in FIGS. 3a) and 3b) according to the second embodiment $12_2$ differs only in the dimensions of the collection receptacle according to the first embodiment. As can be seen, in particular, from FIGS. 3a) and 3b), the central projection 38 has a coupling opening 52 that opens into the hollow space 39 and tapers conically viewed from the free end 41. Furthermore, the central projection 38 has two recesses 54 that pass through the wall 14 and separate the locking arms $48_1$ and $48_2$ from each other.

As can be further seen from FIG. 2, the coupling elements 40, 42 are shaped so that the filter press 30 or the lower plate 34 of the filter press 30 has a distance X to the edge 18 of the collection receptacle $12_1$ in the coupled state with respect to the longitudinal axis L. Consequently, in contrast to the infusion device shown 10 in FIGS. 1a) and 1a), it is not necessary to insert the filter press 30 for coupling in the collection receptacle $12_1$. The coupling elements 40, 42 define, in the coupled state, a unique position of the piston-filter arrangement 26 relative to the collection receptacle $12_1$, whereby the coupling is also enabled with a low expenditure of force, because the insoluble material 37 can be compressed only up to a certain degree of compression. The distance X is dimensioned so that a force that is not too high is applied to the water and the insoluble material 37 cannot be compressed so much that a portion of the water can flow suddenly from the area under the filter press 30 through the contact surface 36 into the area above the filter press 30.

The wall 14 of the collection receptacle $12_1$ forms the base area 56 and a side area 58, wherein the wall 14 runs approximately perpendicular to the base area 56 in the side area 58. Furthermore, the collection receptacle $12_1$ has a number of drainage openings 50 that are arranged in the base area 56 and in the transition area between the base area 56 and the side area 58 and pass through the wall 14 of the collection receptacle $12_1$, whereby water can be removed from the insoluble material 37 collected in the collection receptacle $12_1$. In addition, the passage openings 50 have the effect that an elevated pressure cannot build up in the collection receptacle $12_1$.

In particular, by means of the distance X between the edge 18 and the filter press 30 and with the use of the spherical section 46 of the second coupling element 42 and the locking arms 48 of the first coupling element 40 surrounding the spherical section 46, it is possible to rotate the collection receptacle $12_1$ with respect to the piston-filter arrangement 26. In this way, the user can move the collection receptacle $12_1$ into a position that is favorable for him or her relative to the piston-filter arrangement 26, which significantly simplifies the separation of the collection receptacle $12_1$ from the piston-filter arrangement 26 after the infusion device 10 has been used.

As can be seen from FIG. 3a), the collection receptacle $12_2$ has the diameter DA and starting from the base area 56 at the edge 18 the height H2. The central projection 38 has, starting from the base area 56, the height H1. One can see that the projection 38 extends with a height difference $\Delta H = H1 - H2$ past the edge 18.

In all of the embodiments of the collection receptacle 12 according to the proposal, the height difference is between 1 mm and 8 mm. Furthermore, the ratio of the height difference $\Delta H$ to the diameter DA is between 0.01 and 0.07. The volume provided by the collection receptacle 12 is between 5 and 25 cm³.

In Table 1, three embodiments of collection receptacles 12 are listed with corresponding dimensions, dimensional ratios, and volumes. Also specified is the diameter DC of the container 10, with which the collection receptacle 12 can be used.

TABLE 1

Dimensions of various embodiments of the collection receptacle 12 according to the proposal.

|  | Collection receptacle 1 | Collection receptacle 2 | Collection receptacle 3 |
|---|---|---|---|
| DC (mm) | 68 | 96 | 116.5 |
| DA (mm) | 61.2 | 88.5 | 107 |
| H1 (mm) | 39.9 | 53.6 | 43.6 |
| H2 (mm) | 36.3 | 50 | 40 |
| ΔH (mm) | 3.6 | 3.6 | 3.6 |
| ΔH/DA | 0.058 | 0.041 | 0.034 |
| V (cm³) | 10.3 | 19.5 | 22.1 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

10 Infusion device
10P Infusion device according to the prior art
12, $12_1$, $12_2$ Collection receptacle
14 Wall
16 Opening
18 Edge
20 Container
22 Open end
24 Closed end
26 Piston filter arrangement
28 Piston rod
30 Press filter
32 Upper plate
34 Lower plate
36 Contact surface
37 Insoluble material
38 Projection
39 Hollow space
40 First coupling element
41 Free end
42 Second coupling element
44 Positive-locking means
46 Spherical section
48, $48_1$, $48_2$ Locking arm
49 Back-cut sections
50 Drainage opening
52 Coupling opening
54 Recess
56 Base area
58 Side area
DA Diameter of collection receptacle
DC Diameter of container
H1 Height of projection
H2 Height of collection receptacle at edge
ΔH Height difference H1−H2
L Longitudinal axis
V Volume of collection receptacle
X Distance

I claim:

1. A collection receptacle assembly for collecting insoluble material that is used for preparing beverages by an infusion device, wherein the infusion device comprises:
   a container with an open end and a closed end for holding the beverage and the insoluble material;
   a piston-filter arrangement that can be inserted into the container via the open end and can be moved toward the closed end, wherein the collection receptacle is configured for insertion into the container; and a collection receptacle having a wall that forms an opening that is surrounded by an edge, a first coupling element that can be coupled with a second coupling element of the piston-filter arrangement such that, in a coupled state, a distance (X) is defined between the edge of the collection receptacle and the piston-filter arrangement, wherein the first coupling element is arranged on a central projection of the collection receptacle and the central projection projects past the edge, wherein the central projection encloses a hollow space, the first coupling element comprises a coupling opening that opens into the hollow space on a free end of the central projection, the coupling opening tapers conically when viewed from the free end.

2. The collection receptacle assembly according to claim 1, wherein the central projection has a first height (H1) and the collection receptacle has a second height (H2) at the edge and the central projection projects with a height difference (ΔH) between one millimeter and eight millimeters (1-8 mm).

3. The collection receptacle assembly according to claim 2, wherein the height difference (ΔH) is between two and six millimeters (2-6 mm).

4. The collection receptacle assembly according to claim 2, wherein the collection receptacle has a diameter (DA) and a ratio of the height difference (ΔH) to the diameter (DA) is between one one-hundredth and seven one-hundredths (0.01-0.07).

5. The collection receptacle assembly according to claim 1, wherein the central projection has at least one recess starting from the free end and passing through the wall.

6. The collection receptacle assembly according to claim 1, wherein the central projection is formed by the wall.

7. The collection receptacle assembly according to claim 1, wherein the wall defines a base area and a side area, the wall in the side area extending approximately perpendicular to the base area.

8. The collection receptacle assembly according to claim 7, wherein the collection receptacle has drainage openings arranged in the base area.

9. An infusion device for preparing beverages, the infusion device comprising:

a container with an open end and a closed end configured for holding a beverage and insoluble material;

a piston-filter arrangement configured for insertion into the container via the open end and for movement toward the closed end; and a collection receptacle configured for insertion into the container, the collection receptacle including a wall having an edge and defining an opening, the collection receptacle configured for coupling with the piston-filter arrangement, wherein, in a coupled state, a distance (X) is formed between the edge of the collection receptacle and the piston-filter arrangement, wherein the collection receptacle has a central projection enclosing a hollow space, the central projection has a coupling opening that opens into the hollow space on a free end of the central projection, and the coupling opening tapers conically when viewed from the free end.

10. The infusion device according to claim 9, wherein the distance (X) between the edge and the piston filter arrangement is between three and ten millimeters (3-10 mm).

11. The infusion device according to claim 10, wherein the distance (X) is between three and six millimeters (3-6 mm).

12. The infusion device according to claim 9, wherein the collection receptacle includes a first coupling element and the piston-filter arrangement includes a second coupling element, the first and second coupling elements comprise a positive-locking means that interact with each other in the coupled state.

13. The infusion device according to claim 12, wherein one of the first coupling element and the second coupling element comprises an essentially spherical or cylindrical section that is surrounded, in the coupled state, by locking arms.

* * * * *